(12) United States Patent
Stark

(10) Patent No.: US 7,662,290 B2
(45) Date of Patent: Feb. 16, 2010

(54) INTEGRATED WATER DECONTAMINATION PLANT AND WELL PUMP ARRANGEMENT

(75) Inventor: John Stark, Wattenwil (CH)

(73) Assignee: DCT Double-Cone Technology AG (CH)

( * ) Notice: Subject to any disclaimer, the term of this patent is extended or adjusted under 35 U.S.C. 154(b) by 575 days.

(21) Appl. No.: 10/565,523

(22) PCT Filed: Jul. 21, 2004

(86) PCT No.: PCT/CH2004/000461

§ 371 (c)(1),
(2), (4) Date: Jan. 23, 2006

(87) PCT Pub. No.: WO2005/007579

PCT Pub. Date: Jan. 27, 2005

(65) Prior Publication Data

US 2006/0226077 A1    Oct. 12, 2006

(30) Foreign Application Priority Data

Jul. 22, 2003   (WO) .................... PCT/CH03/00499

(51) Int. Cl.
*B01D 65/00*   (2006.01)

(52) U.S. Cl. .................. 210/652; 166/75.11; 166/105; 166/265; 166/267; 210/137; 210/167.01; 210/195.1; 210/195.2; 210/257.1; 210/258; 210/321.66; 210/747; 210/805; 210/806; 210/257.2; 210/321.65; 210/739; 417/53; 417/76; 417/87; 417/151; 417/244

(58) Field of Classification Search .................. 210/137, 210/167.01, 195.1, 195.2, 257.1, 257.2, 258, 210/259, 321.65, 321.66, 747, 805, 806, 210/652, 739; 166/75.11, 105, 265, 267, 166/369; 137/842; 175/65, 66, 206, 207; 417/53, 76, 77, 87, 151, 244, 245, 246
See application file for complete search history.

(56) References Cited

U.S. PATENT DOCUMENTS 2,682,225 A * 6/1954 Coberly ...................... 417/87

(Continued)

FOREIGN PATENT DOCUMENTS

EP          0 055 981 A       7/1982

(Continued)

OTHER PUBLICATIONS

European International Search Report PCT/CH2004/000461 dated Oct. 18, 2004.

*Primary Examiner*—Joseph W Drodge
(74) *Attorney, Agent, or Firm*—Ostrolenk Faber LLP

(57) ABSTRACT

The present invention removes contaminants from well water without creating the problem of large volumes of waste liquid disposal. It uses double-cone devices as pressure amplifiers which due to their lack of moving parts avoid the risk of additional contamination of the well and provide a prolonged lifetime. For toxic contaminants, a periodic purging of the concentrated contaminants is required. In the case of (sea) salt contamination, there is no waste brine to be continuously handled at all and the system may be run without interruption over an extended period. In this case, the brine is dumped into the well simply by periodically stopping the plant. The brine pours out of the double-cone unit(s) and due to its higher density, sinks down in the well without disturbing the operation of the purification plant.

13 Claims, 6 Drawing Sheets

U.S. PATENT DOCUMENTS

| | | | | |
|---|---|---|---|---|
| 3,616,912 | A | * | 11/1971 | Bruton ............... 210/89 |
| 4,341,629 | A | * | 7/1982 | Uhlinger ............... 210/128 |
| 4,366,063 | A | * | 12/1982 | O'Connor ............... 210/652 |
| 4,603,735 | A | * | 8/1986 | Black ............... 166/68 |
| 4,792,284 | A | * | 12/1988 | Straub et al. ............... 417/77 |
| 5,147,530 | A | * | 9/1992 | Chandler et al. ............... 210/90 |
| 5,695,643 | A | * | 12/1997 | Brandt et al. ............... 210/652 |
| 6,036,870 | A | * | 3/2000 | Briant et al. ............... 210/781 |
| 6,540,487 | B2 | | 4/2003 | Polizos et al. ............... 417/65 |
| 6,547,965 | B1 | * | 4/2003 | Chancellor ............... 210/321.66 |
| 6,701,960 | B1 | * | 3/2004 | Stark et al. ............... 137/842 |
| 7,077,207 | B2 | * | 7/2006 | Stark et al. ............... 166/369 |
| 7,128,092 | B2 | * | 10/2006 | Stark et al. ............... 137/545 |
| 2002/0066568 | A1 | * | 6/2002 | Buchanan et al. ............... 166/313 |

FOREIGN PATENT DOCUMENTS

| | | | |
|---|---|---|---|
| EP | 1 161 981 | A | 12/2001 |
| EP | 1 243 748 | A | 9/2002 |
| EP | 1243748 | * | 9/2002 |
| GB | 02 363 741 | | 1/2002 |
| WO | WO 00/75510 | A | 12/2000 |
| WO | WO 01/16493 | A | 3/2001 |

* cited by examiner

INTEGRATED WATER DECONTAMINATION PLANT AND WELL PUMP ARRANGEMENT

CROSS REFERENCE TO RELATED APPLICATION

The present application is a 35 U.S.C. §§ 371 national phase conversion of PCT/CH2004/000461filed 21 Jul. 2004 which claims priority to PCT/CH2003/00499 filed 22 Jul. 2003, herein incorporated by reference. The PCT International Application was published in the English language.

BACKGROUND OF THE INVENTION

The present invention relates to a system for drawing water from contaminated wells and treating the water drawn thereof.

The availability of safe drinking water is rapidly decreasing due to contamination of sweet water reserves, brought about by excessive non-sustainable supply. As a result, the water from these sources often needs to be purified before it can be used for potable purposes. This process of purification is referred to as water treatment.

A typical water treatment process is a two-stage process. The first stage is the drawing of water from the natural/artificial sources such as wells, rivers and even the sea. Water is drawn from these sources using various types of devices. Specifically, for well water, well pumps are used to draw water from the well to the ground level. Water drawn from the well is often saline in nature. Hence, the second stage of water treatment is the process to remove contaminants and dissolved salts from the water obtained in the first stage.

The second stage is further segmented into various processes. In particular, water is first filtered to remove large sized contaminants such as silt, and various microorganisms. This stage of water treatment mimics the natural filtration of water as it moves through the ground. Filtration is followed by various treatments such as the application of chemical disinfectants and/or UV radiation so as to kill or neutralise the more dangerous bacterial and viral contaminants.

The remaining solutes and active contaminants that have not yet been removed or neutralised are extracted, where possible, using various forms of membrane technology, dialysis etc. The salt component removal is referred to as the process of desalination. Desalination is one of the more costly and high energy aspects of the water treatment process. Hence, improvements in the desalination process have a substantial impact on the availability of water. Desalination can be performed using a number of techniques, inter alia reverse osmosis (RO).

Reverse osmosis based desalination consumes relatively little energy and is gaining popularity for small and medium scale desalination. A RO-based desalination unit comprises a high-pressure pump, a module divided into two chambers by a semi-permeable membrane and a pressure control unit. The saline water is pumped into the module using a pressure-amplifying device such as a high-pressure pump. The semi-permeable membrane permits a water flux across the membrane, but inhibits the transport of salts. The water (permeate) in the low-pressure chamber beyond the membrane is desalinated, and the salt is left behind in the high-pressure chamber in front of the membrane. The concentrated salt water in this high-pressure chamber leaves the module via a pressure control valve. The desalinated water (hereinafter referred to as sweet water) can easily be polished for various end uses such as drinking or agricultural purposes. The concentrated salt solution (hereinafter referred to as brine) is the waste product that requires disposal.

The brine produced in the RO-based desalination process has a higher salt concentration than that of the feedstock. Unless there is a clear use for this brine it can represent a serious nuisance value, as it has to be disposed of. In particular, the brine cannot be poured onto the land or allowed to contaminate sweet water reserves. Also, the energy stored in the high-pressure brine line is lost if the brine is just jetted into the environment. One way of avoiding the energy loss is to use a hydraulic energy recovery system mounted on the brine line. This solves the problem of substantial energy recovery, but does not provide a solution concerning the brine disposal.

Such energy recovery systems are described e.g. in U.S. Pat. No. 6,540,487 and GB-02 363 741.

Whilst the energy stored in the brine solution is used to reduce energy consumption in the desalination unit, the brine solution still needs to be disposed of after passing through the energy recovery unit. Hence, there is a need for a method and system, which avoids the disposal of the brine solution into the environment.

Apart from the problem of disposal of the brine solution, there are various other problems with the existing water treatment processes. In particular, there are problems associated with the method used for drawing water from a deep well.

Deep wells, such as those that would have to be tapped in many inland arid areas, require the lowering of an electrically driven pump down to the bottom of the well. The performance of the pumps is dependent on the bore size of the well. In particular, a large borehole permits the use of a sufficiently large diameter pump to cope with a high flow rate. However, for deep wells it is unrealistic to drill bore sizes that exceed 200-300 mm and so the mechanical pump that can be lowered down is limited in performance. Thus, the volume of water that can be drawn from a deep well is not very high even if the aquifer has a very large capacity. This problem is very prominent in places far away from the sea and especially in arid regions, which have scarce water resources. The water table in such areas is often found to be very low down necessitating deep wells. Limited water resources imply that these wells must be fully utilised and run at flow rates that are sustainable and yet large enough to satisfy the water requirement.

Furthermore, the known pumps generally comprise moving parts and in consequence run a risk of contamination either by lost lubricants or by wear of the moving parts.

Like all machines having moving parts, they need some kind of maintenance and have a limited lifetime.

SUMMARY

The present invention is directed towards a water treatment method and system for well water.

SUMMARY OF THE INVENTION

One object of the present invention is to solve the problem of brine disposal into the environment.

Another object of the present invention is to recover energy stored in the brine by-product line by utilising the energy within the water treatment system.

Yet another object of the present invention is to increase the rate at which water can be drawn out of a deep well.

According to another aspect, it is an object of the invention to avoid the drawbacks of known well pumps.

Still another object of the present invention is directed towards the integration of decontamination plants, more specifically desalination plants, with well pumping arrangements in order to achieve a sweet water productivity that is greater than 90% and avoids the problem of brine disposal.

At least the first of these objectives are achieved by using a water treatment system comprising a desalination unit and a well pumping unit such that the brine produced as a by-product of decontamination is used as feed to run the well pump arrangement.

A well-pumping arrangement according to the invention comprises one or more well pumps to draw water from the bottom of the well to the Earth's surface. The water drawn is stored in an intermediate reservoir. This water, which is generally saline in nature and not suitable for drinking purposes, is desalinated using a desalination unit. The desalination unit comprises a pumping arrangement that forces the saline water into a separation unit. The separation unit comprises a module separated into two volumes by a semi-permeable membrane. The semi-permeable membrane allows water to pass through while the salts are retained. The water that is passed through is desalinated and may be used for drinking, while the concentrated salt solution that is left behind is utilised as feed to run the well pump arrangement, which comprises at least one double-cone unit, e.g. as described in WO-A-02/075 109, which is hereby incorporated by reference.

In a preferred embodiment of the present invention, two well pumps in series are lowered down the well. The first well pump is used to increase the volume feed to the second well pump by absorbing the surplus pressure in the brine line. The enhanced feed at lower pressure then drives the second well pump, which sends proportionaly more water back to the surface.

In another aspect, the invention not only provides to desalinate well water without the requirement to deal with brine disposal. It also proposes embodiments, where pollutants, including toxic chemicals, are concentrated into a small volume of water for batch neutralisation outside of the system.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The preferred embodiments of the present invention disclose a water treatment method and system for well water pumping that is designed to avoid disposal of large volumes of brine solution into the environment and reduce energy consumption. They comprise an integrated desalination unit and well pumping arrangement such that the brine solution produced as a by-product of the desalination process acts as the feed for the well pump arrangement.

Figure 1:
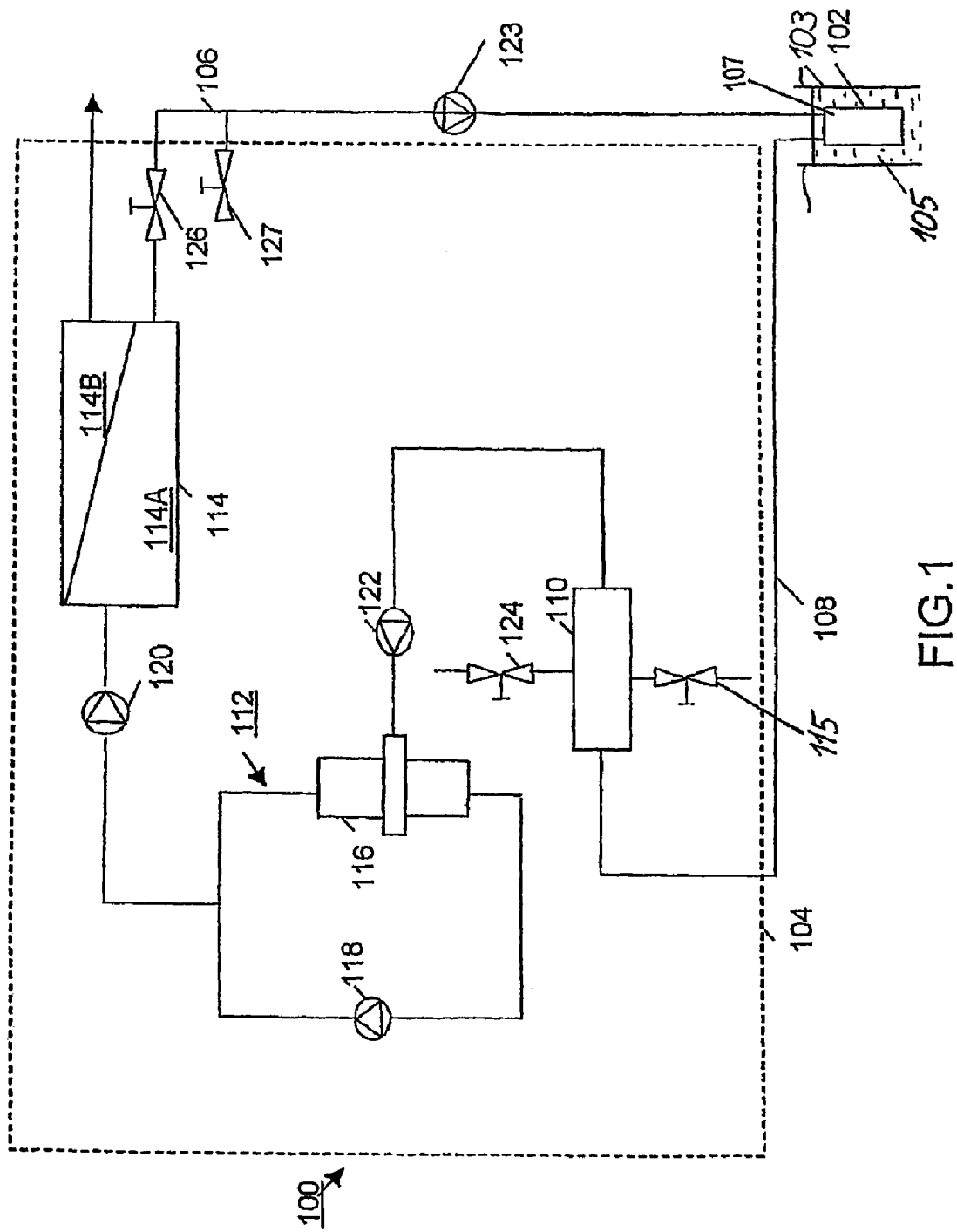
FIG. 1 illustrates a water treatment system in accordance with a preferred embodiment of the present invention.

FIG. 1 illustrates a water treatment system 100 in accordance with a preferred embodiment of the present invention. System 100 comprises a well pumping arrangement 102, a desalination unit 104 and a brine line 106 for carrying a feed from desalination unit 104 to well pump arrangement 102.

Well pump arrangement 102 is used to draw water from the well to the surface. Well pump arrangement 102 comprises a well pump to draw water from the well and an exit line 108 to carry the water drawn from the well. Typical well pumping devices include a jet pump, a centrifugal pump, a submersible pump and a double-cone device. In a preferred embodiment, a double-cone well pump arrangement a so-called DC well pump pressure amplifier (DC-WPPA)(as described in PCT patent application WO-A-02/075 109) is used for drawing water from the well. It should be apparent to one skilled in the art that any well pump arrangement can be used for drawing water from the well. The water drawn from the well is saline in nature. The saline well water is passed through desalination unit 104.

A double-cone device (DC) shall be understood as a double-cone device as defined in the preceding patent applications of the applicant, specifically PCT application WO-A-02/075 109, which is hereby incorporated by reference.

The DC well pump pressure amplifier (DC WPPA) 102 is lowered down the salt water contaminated well 103. The DC WPPA 102, which is driven by a high-pressure salt solution, draws in well water 105 by its inlet 107 that effectively dilutes the driving salt solution. The diluted solution is returned to the surface by means of the pumping action of the DC WPPA 102.

Desalination unit 104 comprises an intermediate (atmospheric) pressure reservoir 110, a pumping arrangement 112 and a separation unit 114. Intermediate reservoir 110 stores the saline well water drawn using well pumping arrangement 102. It is provided with an opening 115 for removing accumulated solid materials and the like. Pumping arrangement 112 can be a high pressure generating system. It forces the saline well water into separation unit 114. In a preferred embodiment, a closed loop pumping arrangement comprising a double-cone device 116 (as described in PCT patent application WO-A-01/16493 of the applicant) and a circulation pump 118 is used. Circulation pump 118 is a low-pressure pump unit, which is connected downstream to double-cone device 116. The closed loop arrangement enables saline water to be pressurised and then transferred to the separation unit 114 at high pressure. The desalination unit 104 in a preferred embodiment is a double-cone device based desalination unit, preferably as described in the patent application WO-A-01/16493 incorporated herein by reference.

Separation unit 114 is a module divided into two volumes 114A and 114B by a semi-permeable membrane. The semi-permeable membrane allows water to pass through while retaining the dissolved salts present in the saline water. As a result, only sweet water with an extremely low concentration of salt is transferred to volume 114B. The remaining salt solution in volume 114A becomes more concentrated due to loss of water. Desalinated water is the water suitable for drinking, whilst the remaining salt solution (hereinafter referred to as brine) is the by-product.

The brine is passed through brine line 106 into well pump arrangement 102. Brine line 106, which may optionally contain a booster pump 123, can be any fluid carrying device such as a pipe to carry the brine to well pump arrangement 102. Brine acts as the feed to run well pump arrangement 102. Utilizing brine as the feed also allows system 100 to consume the energy stored in brine, which otherwise would have been wasted. Booster pump 123 can also be used for very deep wells (>500 m).

In an alternative embodiment, a pressure regulating valve 124 can also be added to intermediate reservoir 110 for permitting a pressurised feed to pump 122 thereby reducing the power requirement of pump 122.

Further, a bleed 127 is added to brine line 106 so as to check and adjust the brine concentration. Also, a pressure reduction valve 126 is added to reduce the brine pressure to a level prescribed by bleed 127. As the brine concentration rises, it is necessary to open the valve 126 and vice versa. Thus, the inclusion of this bleed 127 allows the monitoring of the brine solution concentration and subsequent adjustment of the valve 126.

Additionally, circulating pumps are used at various places within the water treatment system. A circulating pump is a low pressure, high flow rate pump. Specifically, a circulation pump 120 can be placed between separation unit 114 and pumping arrangement 112 to further facilitate the flow of water into separation unit 114. Similarly, a circulation pump 122 can be placed between intermediate reservoir 110 and pumping arrangement 112 to increase the flow of water to pumping arrangement 112. It should be apparent to one skilled in the art that a plurality of circulation pumps can be placed to increase the flow of water. Further, a variety of circulation pumps can be used.

In an alternative embodiment, a pressure regulating valve 124 can also be added to intermediate reservoir 110 for permitting a pressurised feed to pump 122 thereby reducing the power requirement of pump 122.

Figure 2:
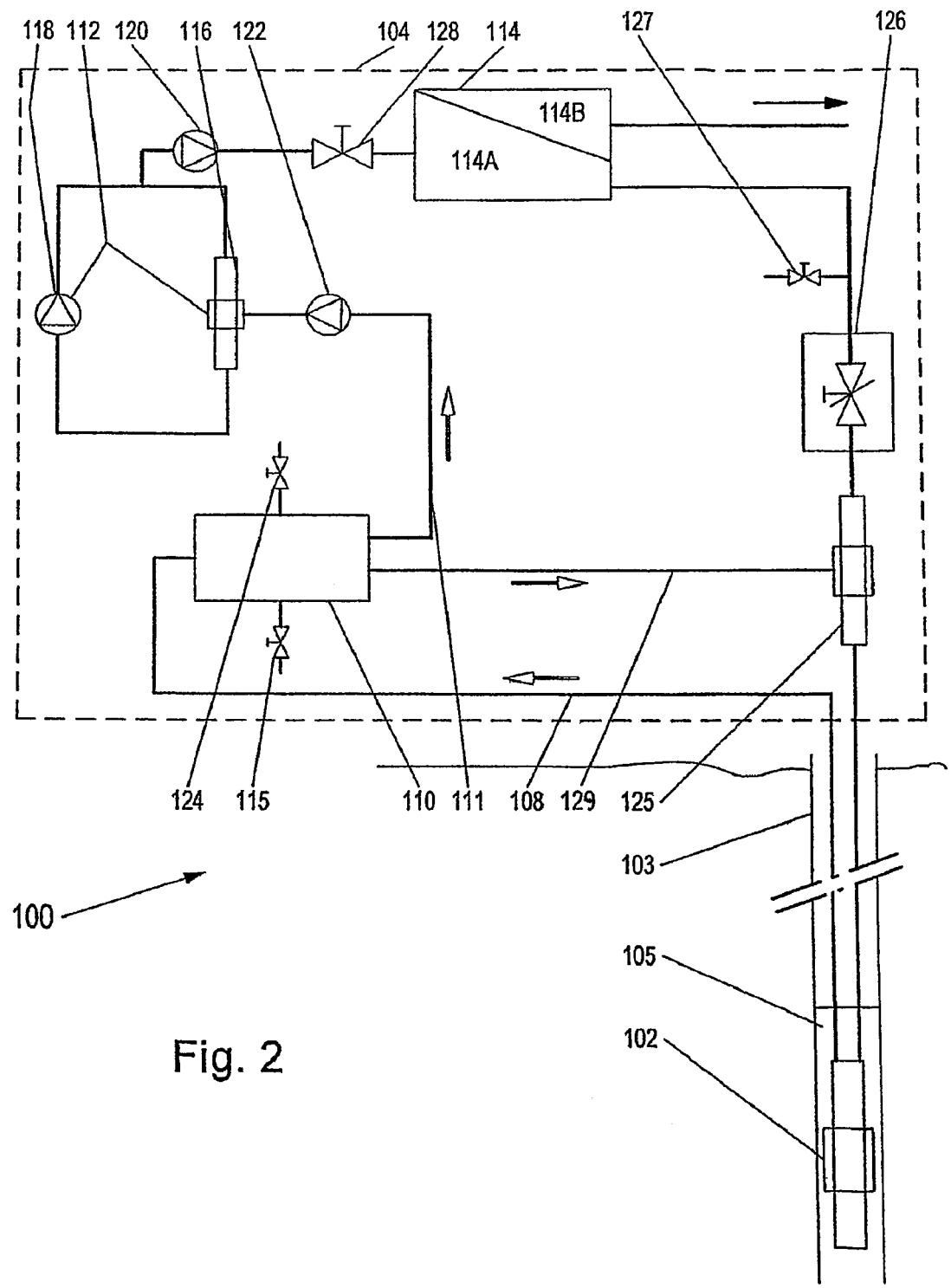
FIG. 2 to 4 show modifications of the system of FIG. 1.

FIG. 2 shows an embodiment where the booster pump is a second DC pressure amplifier DC PA2 125. The brine exiting the separation unit 114 (preferably a reverse-osmosis unit [RO]) and still under high pressure, exits through the pressure reduction valve 126 and drives DC PA2 125. Salt solution is drawn into DC PA2 125, due to the pressure amplifier's characteristic functioning, from the intermediate reservoir 110 through line 129. This influx effectively dilutes the high-pressure brine stream, lowering its pressure slightly, but increasing the flow volume. This high-pressure salt solution stream is used to drive the DC WPPA 102 (well pump).

The reason for DC PA2 125 is to enable the whole system to run for long periods continuously without a too rapid build-up of salt concentration. Once the system salt concentration exceeds the viable operating limit, the shutdown valve 128 is closed and the system salt solution drains back into the well through the inlet ports of the DC WPPA 102. It is not necessary to shut down pump 118, but advisable to stop the (optional) pumps 120, 122. The denser system salt solution sinks to the bottom of the well 103 and will percolate downwards out of the well 103 if the well 103 is constructed correctly. Normally the incoming well water flows in through porous well liner sections some distance above the sump (bottom) of the well 103.

This system ensures that the user does not have to deal with any waste brine solution, and at the same time does not risk continuously contaminating the well water because the circulating water of increased concentration is returned into the well periodically with the well pump being stopped. The salt concentration within the system does not influence the salt concentration within the well whilst the system is running.

Figure 3:
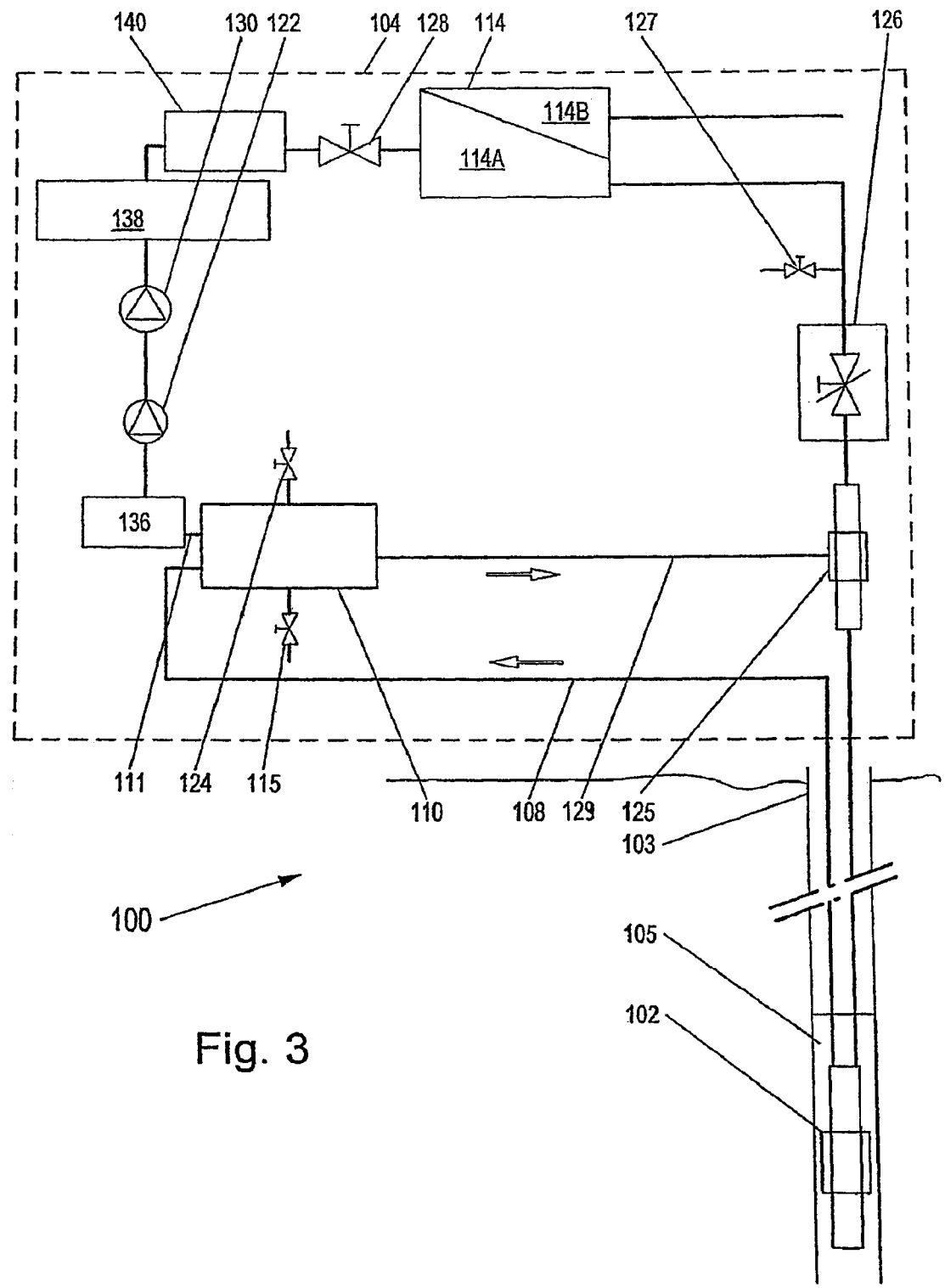

In FIG. 3 a scheme somewhat similar to that shown in FIG. 2 is presented. The only difference lies in the fact that the DC high-pressure circuit 112 is replaced by a high-pressure pump 130. In particular, the periodic draining of the system requires much more care as the shutdown valve 128 cannot be closed without stopping the high pressure pump 130 or arranging an adequate bypass loop. From a sweet water production point of view, the end result is similar in concept in that only sweet water is produced and the end user does not have to concern himself with brine disposal.

As a function of the system component requirements, specifically the RO unit 114, a fine filter 136, a rupture safety device 138 and/or a pulsation damper 140 are arranged around the high pressure pump 130. These devices are known per se and need not be described in detail. The fine filter 136 is placed upstream of the high pressure pump 130, the other two devices 138, 140 downstream.

Figure 4:
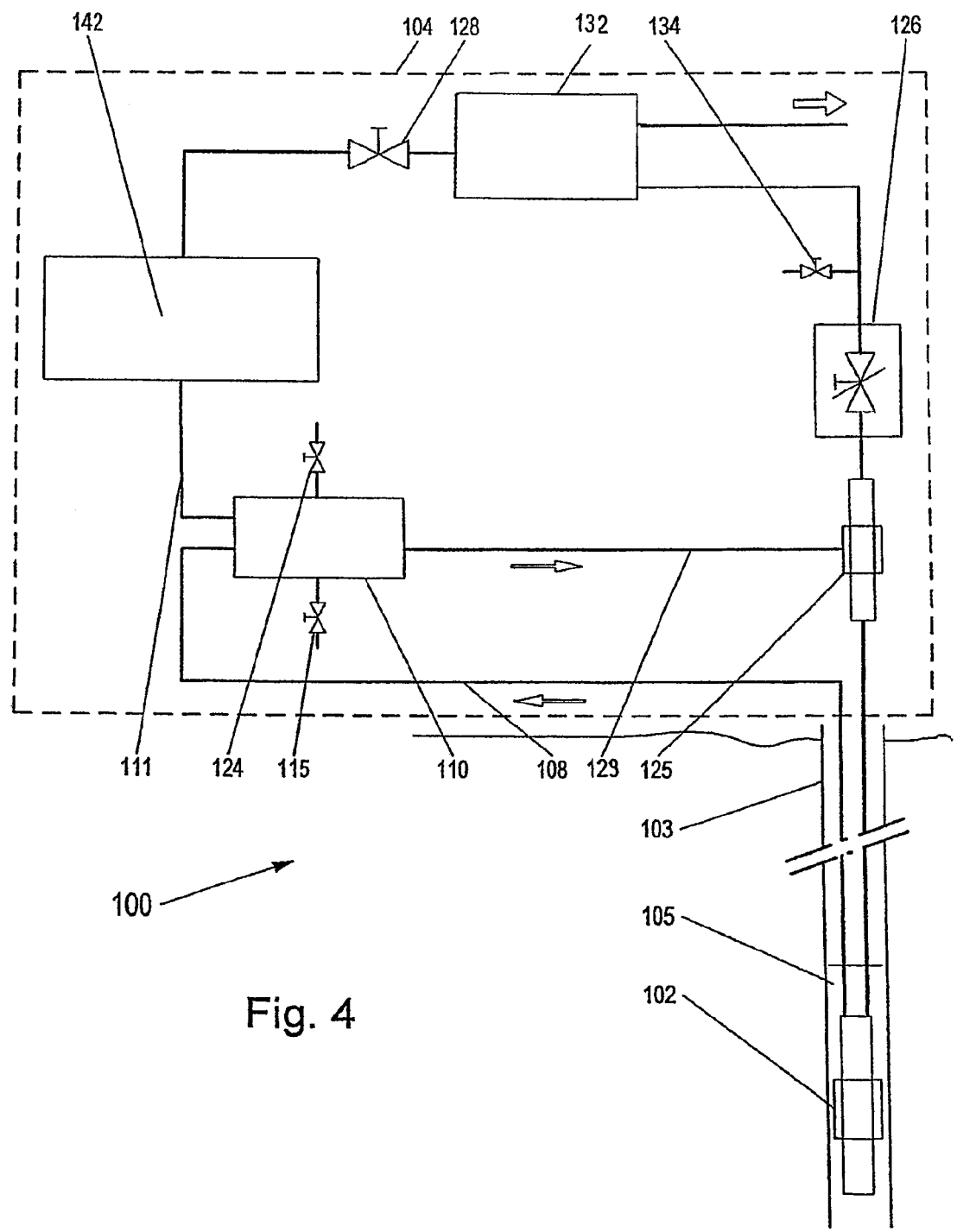

The scheme laid out in FIG. 4 will function with either a DC high-pressure circuit or a high-pressure pump as high pressure generator 142. The difference between FIG. 4 and the preceding two figures lies in the fact that the membrane unit 114 is replaced by a separator unit 132 specifically chosen to remove the well water pollutants such as arsenic, nitrates etc. In this case, a purge 134 is foreseen so as to extract periodically the concentrated contaminant.

In general, instead of or additionally to a pressure reducing valve 126, a pressure energy recuperation system, e.g. like those mentioned in the introduction, may be used. The pressurising part of such a system is arranged before or after the end pressurising unit (DC-PA 142) in order to reduce the pressure difference the latter has to create.

Figure 5:
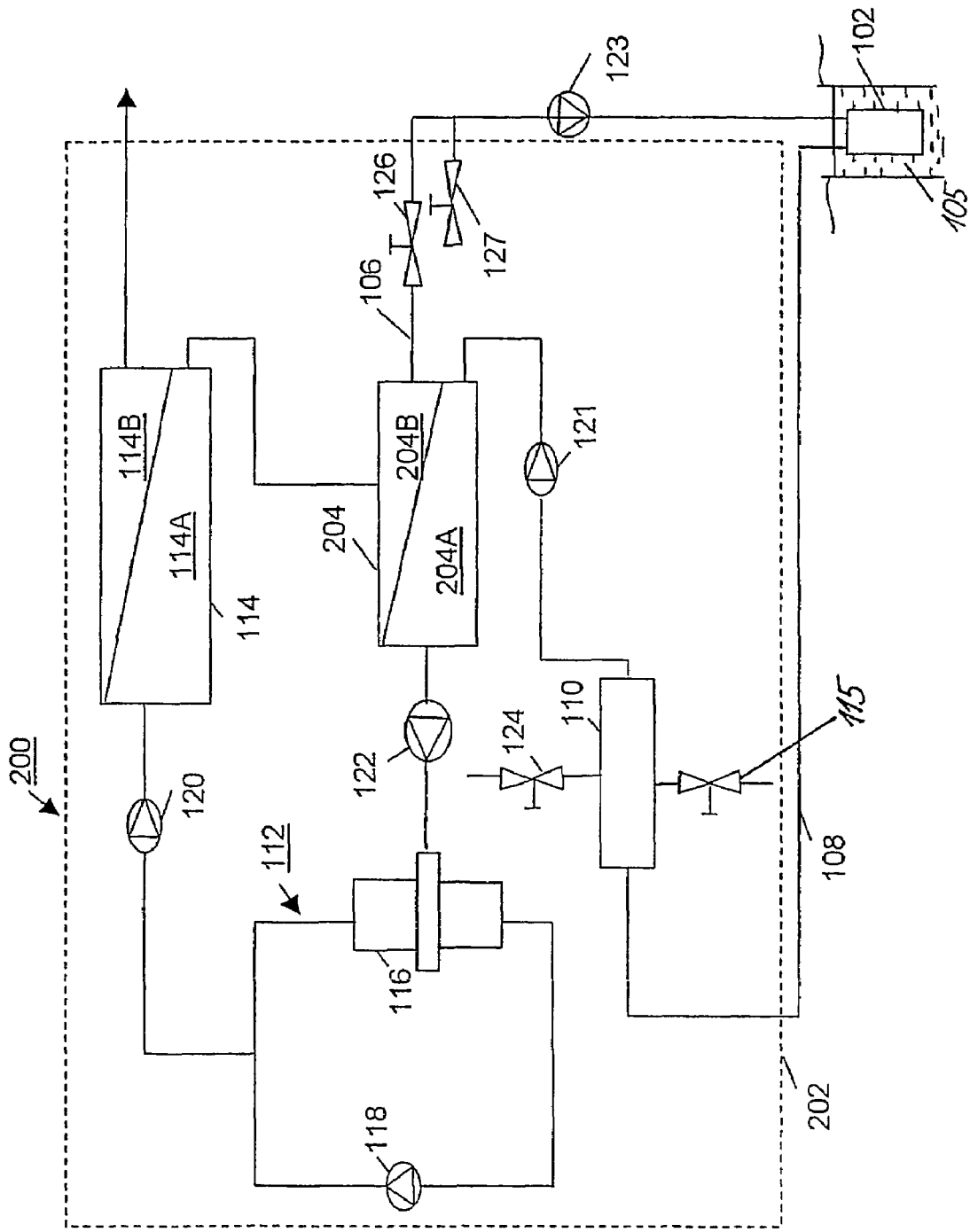
FIG. 5 illustrates an alternate embodiment of the present invention.

FIG. 5 illustrates an alternative embodiment of the present invention that uses a second separation unit. System 200 comprises a desalination unit 202 and a well pumping arrangement 102. The water drawn by the well pumping arrangement is stored in intermediate reservoir 110. The water flows to pumping arrangement 112 through a separation unit 204.

Separation unit 204 is a module separated into two volumes 204A and 204B by a semi-permeable membrane. Volume 204A beyond the membrane contains water with a low salt concentration while volume 204B contains brine. The brine is used as the feed for well pumping arrangement 102. Low salt concentration water is forced into separation unit 114 by pumping arrangement 112. Separation unit 114 produces desalinated water as well as high-pressure brine. The high-pressure brine is sent to volume 204B where the residual pressure is used to drive a dilute salt solution out of the brine across the membrane into the incoming well water in volume 204A. The result of this operation is that the brine concentration is increased substantially and the incoming well water has its salt concentration reduced.

Figure 6:
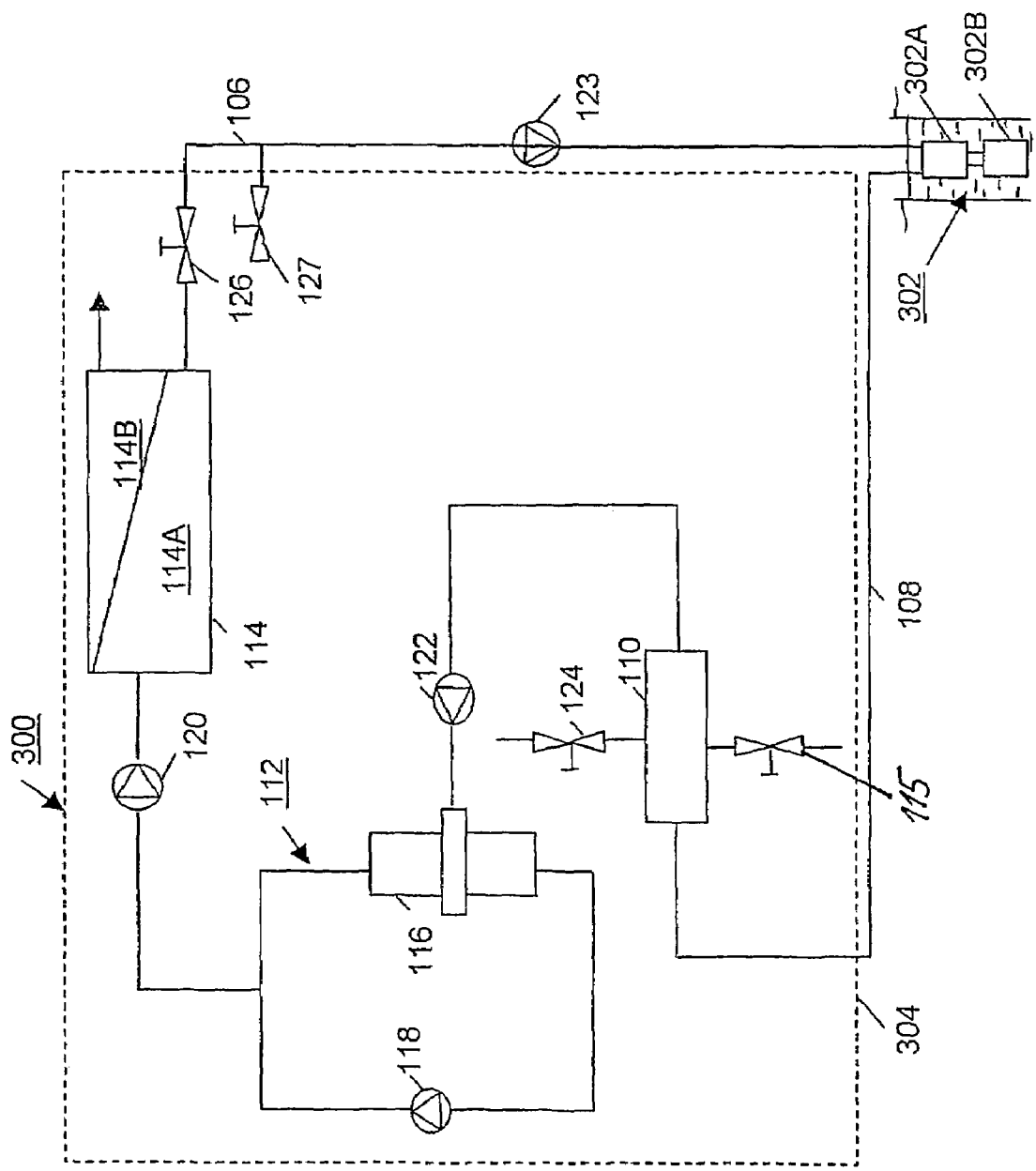
FIG. 6 illustrates another embodiment of the present invention.

In yet another embodiment, a plurality of well pumps is used to increase the volume of water that can be drawn from the well. FIG. 6 illustrates a water treatment system 300 comprising well pumping arrangement 302 being fed by brine and a desalination unit 304. Well pumping arrangement 302 comprises a plurality of well pumps. Specifically, if two double-cone devices for well pumping are used, then a first double-cone device 302A can be used to supplement the available volume of water that can be used for driving the second double-cone device for well pumping 302B. This latter pump sends the water to ground level.

The first pump 302A converts the low volume, high-pressure brine to a lower pressure, higher volume feed capable of driving the well pump 302B. For example, the brine feed pressure can be of the order of 60 bar, whilst the pressure required to pump the water to the surface is approximately 20 bar. Hence, the surplus 40 bar can be used to increase the volume of the available feed needed to drive the pump 302B.

This technique of using two well pumps in series can yield almost twice the sweet water product volume per unit energy input when compared with the existing systems.

It should be apparent to one skilled in the art that modifications described in system 100 can also be applied to the water treatment system 300. Further, well pumping devices other than the double-cone device for well pumping can also be used to enhance the volume of water drawn from the well.

The present invention utilises brine solution within the system. As a result, the brine is not disposed of into the environment, thus preventing pollution. Further, the energy stored within the brine line is recovered, which results in reduced energy consumption.

All the systems described above are well suited to water production in arid regions that have scarce water resources and where the water table is found at deep levels.

Furthermore, they are suited to remove alternatively or supplementarily other annoying or toxic components. In this respect, salinated water is to be understood as representing generally water having disturbing admixtures throughout the specification.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

The invention claimed is:

1. A water treatment system comprising:
   a. a well pump arrangement for drawing contaminated water from a well;
      the well pump arrangement comprising at least one double-cone device, the double-cone device having an inlet where contaminated water is sucked in during operation, the at least one double-cone device being located in the well during operation;
   b. a purification unit for separating the contaminated water into purified water and contaminated solution, the purification unit further comprising:
      i. an intermediate reservoir for storing the contaminated water;
      ii. a pumping arrangement to pressurize the contaminated water obtained from the intermediate reservoir; and
      iii. a separating unit to separate the pressurized contaminated water into purified water and contaminated solution;
   c. a contaminated solution line for carrying the contaminated solution from the separating unit to the well pump arrangement;
   so that contaminated solution pours out of the inlet of the double-cone device and sinks down in the well and disposal of contaminated solution into the environment is avoided, and so that the contaminated solution is reusable as feed for the double-cone device for reusing the energy stored in it.

2. The system according to claim 1, wherein the well pump arrangement for drawing contaminated water from the well comprises:
   a. a first double-cone device to convert a low flow rate high pressure contaminated solution feed into a lower pressure higher volume feed using the available well water; and
   b. at least one second double-cone device to utilise the enhanced feed so as to draw even more water from the well onto the ground level;
   whereby the well pump arrangement increases the volume of water that can be drawn from the well.

3. The system according to claim 1, wherein the pumping arrangement to pressurize the contaminated water is a closed loop comprising:
   a. a double-cone device for pressurizing the contaminated water obtained from the intermediate reservoir and
   b. a circulating pump connected to the inlet of the double-cone device to improve the flow of the contaminated water in the closed loop.

4. The system according to claim 1, further comprising a second separation unit that utilises the pressure of the contaminated solution to dilute water from the intermediate reservoir, yielding a lower concentration contaminated water and a more concentrated contaminated solution,
   wherein the more concentrated contaminated solution is used as feed for the well pump arrangement, and
   wherein the lower concentration contaminated water flows to the closed loop pumping arrangement.

5. The system according to claim 1, further comprising a circulating pump to increase the flow of contaminated water from the intermediate reservoir to the pumping arrangement.

6. The system according to claim 1, further comprising a circulating pump to boost the pressure from the outlet of the pumping arrangement to the separation unit.

7. The system according to claim 1, further comprising one or more pressure regulating valves attached to intermediate reservoir, so as to supplement the feed pressure to the high pressure pump system.

8. The system according to claim 1, wherein the contaminated water is saline water and the contaminated solution is solution.

9. A method for integrating a purification unit and a well pump arrangement to obtain sweet water, the method comprising the steps of:
   a. drawing contaminated water from a well using the well pump arrangement;
   b. passing the contaminated water through the purification unit to obtain sweet water and contaminated solution;
   c. utilising the contaminated solution as a feed to run the well pump arrangement; and
   d. stopping the contaminated solution flow through the well pump when the concentration of the contamination in the contaminated solution exceeds a predetermined limit, so that the contaminated solution exits the well pump into the well in order to avoid disposal of he contaminated solution into the environments,
   wherein at least one double-cone unit is deployed in the well pump arrangement. the at least one double-cone unit being located in the well during operation, and sucking in the contaminated water.

10. The method according to claim 9, wherein the step of utilising the contaminated solution as the feed to run the well pump arrangement further comprises the step of diluting the contaminated solution with well water in order to slow down the build up of the concentration of the contaminant.

11. The method according to claim 9, wherein the step of drawing contaminated water from the well using the well pump arrangement further comprises the step of converting a low volume contaminated water flow into a higher volume contaminated water flow by admixing water of the well.

12. The method of claim 11, wherein the double-cone unit is driven by the contaminated solution as the working fluid.

13. The method according to claim 9, wherein the contaminated water is saline water and the contaminated solution is solution.

* * * * *